(12) United States Patent
Kipnis et al.

(10) Patent No.: US 7,690,029 B2
(45) Date of Patent: Mar. 30, 2010

(54) REMOTE ADMINISTRATION OF SMART CARDS FOR SECURE ACCESS SYSTEMS

(75) Inventors: Shlomo Kipnis, Jerusalem (IL); Rannen Meir, Jerusalem (IL)

(73) Assignee: NDS Limited, Middlesex (GB)

( * ) Notice: Subject to any disclaimer, the term of this patent is extended or adjusted under 35 U.S.C. 154(b) by 1181 days.

(21) Appl. No.: 11/136,182

(22) Filed: May 24, 2005

(65) Prior Publication Data

US 2005/0216732 A1 Sep. 29, 2005

Related U.S. Application Data

(62) Division of application No. 09/415,957, filed on Oct. 8, 1999, now Pat. No. 6,934,855.

(30) Foreign Application Priority Data

Oct. 13, 1998 (IL) ..................... 126552

(51) Int. Cl.
| | |
|---|---|
| G06F 7/04 | (2006.01) |
| G06F 15/16 | (2006.01) |
| G06F 17/30 | (2006.01) |
| G06F 12/00 | (2006.01) |
| G06F 13/00 | (2006.01) |
| H04L 29/06 | (2006.01) |
| G11C 7/00 | (2006.01) |
| G06Q 30/00 | (2006.01) |
| G06Q 20/00 | (2006.01) |
| G06F 15/177 | (2006.01) |

(52) U.S. Cl. ............... 726/9; 726/21; 705/26; 705/65; 709/220

(58) Field of Classification Search ............ 726/9, 726/21; 705/26, 65; 709/220
See application file for complete search history.

(56) References Cited

U.S. PATENT DOCUMENTS 4,159,417 A 6/1979 Rubincam (Continued)

FOREIGN PATENT DOCUMENTS

EP 0683613 11/1995

(Continued)

OTHER PUBLICATIONS

Aboba et al., RFC 2194 Review of Roaming Implementation (1997).

(Continued)

*Primary Examiner*—Shin-Hon Chen
(74) *Attorney, Agent, or Firm*—Ladas and Parry LLP

(57) ABSTRACT

A method for remote administration of at least one smart card via a communication network is described. The method includes the steps of associating the at least one smart card with a remote administrator by storing administrator identification information of the remote administrator in the at least one smart card, inserting the at least one smart card in at least one user unit, employing the administrator identification information stored in the at least one smart card to identify the remote administrator associated with the at least one smart card, and establishing communication between the at least one smart card and the remote administrator via the communication network in accordance with the administrator identification information.

Related apparatus and methods are also described.

8 Claims, 6 Drawing Sheets

U.S. PATENT DOCUMENTS

| | | | |
|---|---|---|---|
| 4,160,242 | A | 7/1979 | Fowler et al. |
| 4,290,062 | A | 9/1981 | Marti et al. |
| 4,350,070 | A | 9/1982 | Bahu |
| 4,405,829 | A | 9/1983 | Rivest et al. |
| 4,589,659 | A | 5/1986 | Yokoi et al. |
| 4,594,663 | A | 6/1986 | Nagata et al. |
| 4,639,225 | A | 1/1987 | Washizuka |
| 4,648,063 | A | 3/1987 | Strout |
| 4,680,459 | A | 7/1987 | Drexler |
| 4,709,136 | A | 11/1987 | Watanabe |
| 4,740,912 | A | 4/1988 | Whitaker |
| 4,748,668 | A | 5/1988 | Shamir et al. |
| 4,855,725 | A | 8/1989 | Fernandez |
| 4,917,292 | A | 4/1990 | Drexler |
| 4,937,821 | A | 6/1990 | Boulton |
| 4,985,697 | A | 1/1991 | Boulton |
| 5,010,571 | A | 4/1991 | Katznelson |
| 5,067,154 | A | 11/1991 | Hosobuchi et al. |
| 5,113,178 | A | 5/1992 | Yasuda et al. |
| 5,167,508 | A | 12/1992 | McTaggart |
| 5,175,416 | A | 12/1992 | Mansvelt et al. |
| 5,224,163 | A | 6/1993 | Gasser et al. |
| 5,239,665 | A | 8/1993 | Tsuchiya |
| 5,282,249 | A | 1/1994 | Cohen et al. |
| 5,285,496 | A | 2/1994 | Frank et al. |
| 5,315,657 | A | 5/1994 | Abadi et al. |
| 5,339,091 | A | 8/1994 | Yamazaki et al. |
| 5,371,493 | A | 12/1994 | Sharpe et al. |
| 5,413,486 | A | 5/1995 | Burrows et al. |
| 5,438,344 | A | 8/1995 | Oliva |
| 5,440,632 | A | 8/1995 | Bacon et al. |
| 5,459,304 | A | 10/1995 | Eisenmann |
| 5,461,217 | A * | 10/1995 | Claus .................. 235/380 |
| 5,466,158 | A | 11/1995 | Smith |
| 5,469,506 | A | 11/1995 | Berson et al. |
| 5,481,609 | A | 1/1996 | Cohen et al. |
| 5,484,292 | A | 1/1996 | McTaggart |
| 5,533,124 | A | 7/1996 | Smith et al. |
| 5,534,888 | A | 7/1996 | Lebby et al. |
| 5,555,446 | A | 9/1996 | Jasinski |
| 5,577,121 | A | 11/1996 | Davis et al. |
| 5,590,199 | A | 12/1996 | Krajewski et al. |
| 5,602,918 | A | 2/1997 | Chen et al. |
| 5,625,404 | A | 4/1997 | Grady et al. |
| 5,630,103 | A | 5/1997 | Smith et al. |
| 5,644,704 | A | 7/1997 | Pease et al. |
| 5,644,768 | A | 7/1997 | Periwal et al. |
| 5,661,635 | A | 8/1997 | Huffman et al. |
| 5,663,748 | A | 9/1997 | Huffman et al. |
| 5,666,412 | A | 9/1997 | Handelman et al. |
| 5,689,648 | A | 11/1997 | Diaz et al. |
| 5,691,525 | A * | 11/1997 | Aoki et al. .................. 235/379 |
| 5,697,793 | A | 12/1997 | Huffman et al. |
| 5,708,709 | A | 1/1998 | Rose |
| 5,720,039 | A | 2/1998 | Lieberman |
| 5,748,732 | A * | 5/1998 | Le Berre et al. ............ 380/229 |
| 5,757,918 | A | 5/1998 | Hopkins |
| 5,761,500 | A | 6/1998 | Gallant et al. |
| 5,774,546 | A | 6/1998 | Handelman et al. |
| 5,778,067 | A * | 7/1998 | Jones et al. .................. 705/65 |
| 5,838,812 | A | 11/1998 | Pare et al. |
| 5,878,134 | A | 3/1999 | Handelman et al. |
| 5,922,074 | A * | 7/1999 | Richard et al. ............... 726/21 |
| 5,941,959 | A * | 8/1999 | Fishler et al. ................ 710/33 |
| 5,943,423 | A | 8/1999 | Muftic |
| 5,949,044 | A * | 9/1999 | Walker et al. ............... 235/379 |
| 6,012,085 | A | 1/2000 | Yohe et al. |
| 6,044,349 | A | 3/2000 | Tolopka et al. |
| 6,055,637 | A | 4/2000 | Hudson et al. |
| 6,151,688 | A | 11/2000 | Wipfel et al. |
| 6,196,459 | B1 * | 3/2001 | Goman et al. ............... 235/380 |
| 6,226,744 | B1 | 5/2001 | Murphy et al. |
| 6,325,292 | B1 | 12/2001 | Sehr |
| 6,367,011 | B1 * | 4/2002 | Lee et al. .................... 713/172 |
| 6,385,729 | B1 | 5/2002 | DiGiorgio et al. |
| 6,405,369 | B1 * | 6/2002 | Tsuria ........................... 725/6 |
| 6,557,032 | B1 * | 4/2003 | Jones et al. .................. 709/220 |
| 2002/0161655 | A1 * | 10/2002 | Bredin ........................ 705/26 |

FOREIGN PATENT DOCUMENTS

| | | |
|---|---|---|
| FR | 2760158 | 8/1998 |
| FR | 2779599 A1 * | 12/1999 |
| WO | 98/37479 | 8/1998 |

OTHER PUBLICATIONS

English Translation of FR 2760158 dated Aug. 28, 1998.
English Abstract of WO 98/37479 dated Aug. 27, 1998.
"Virtual Meetings With Desktop Conferencing" IEEE Spectrum (1998) pp. 47-56.
Oppliger, R., "Internet and Intranet Security" Artech House Publishers (1998) Sec. 10.3, pp. 226-239; Sec. 9.3, pp. 160-177.
O'Mahony, D., et al. "Electronic Payment Systems." Artech House, Inc., Norwood, MA (1997) pp. 183-186.

* cited by examiner

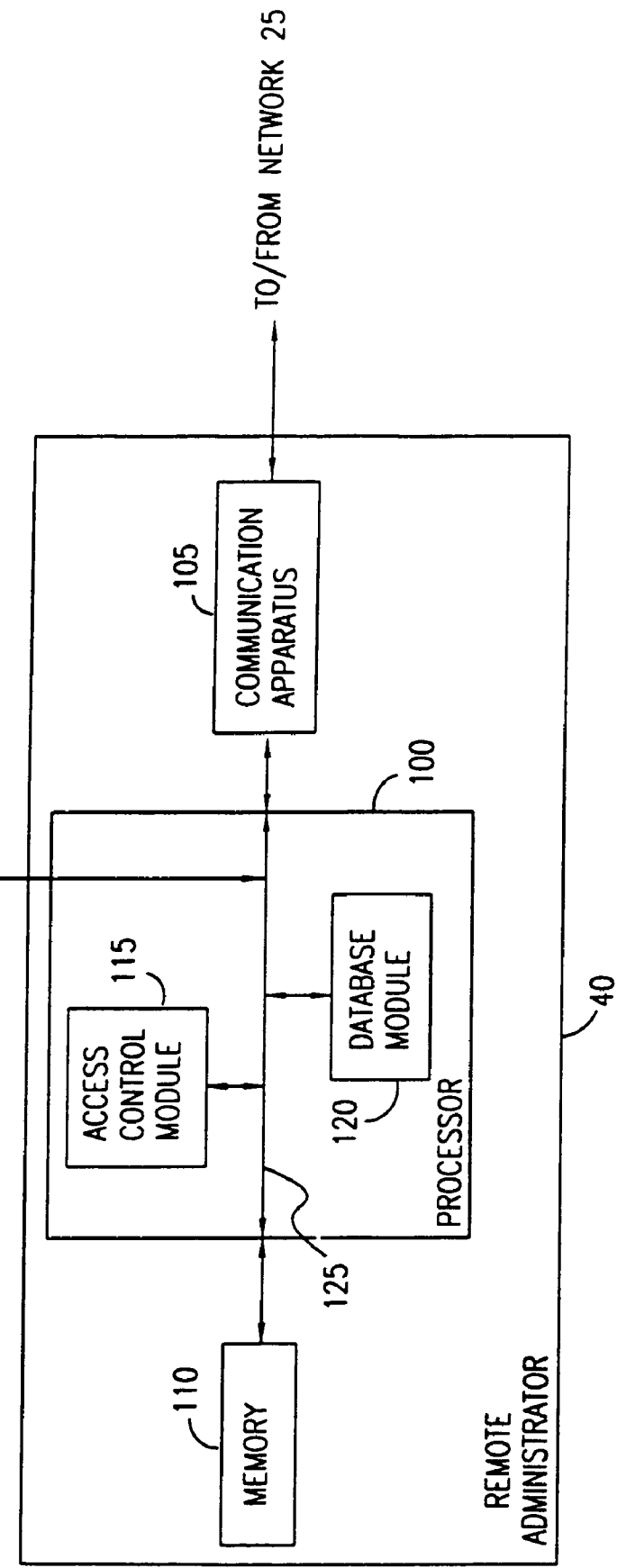

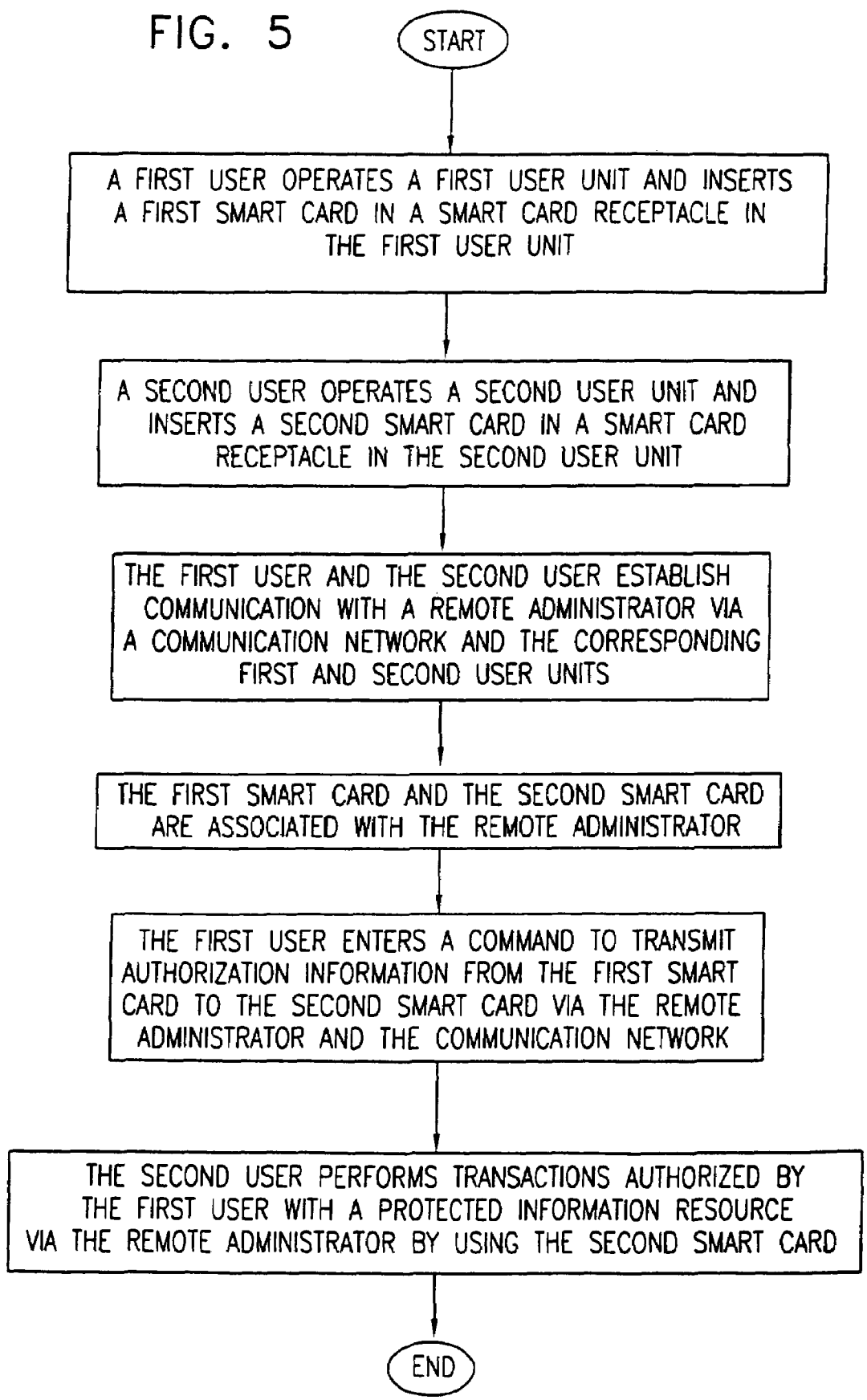

REMOTE ADMINISTRATION OF SMART CARDS FOR SECURE ACCESS SYSTEMS

RELATED APPLICATION INFORMATION

The present application is a divisional application of U.S. patent application Ser. No. 09/415,957, filed Oct. 8, 1999 now U.S. Pat. No. 6,934,855.

FIELD OF THE INVENTION

The present invention generally relates to remote administration of smart cards via communication networks, and more particularly to administration of smart cards in securely accessed information resources and communication networks, such as the Internet, a local-area-network (LAN), a wide-area-network (WAN), and a metropolitan-area-network (MAN).

BACKGROUND OF THE INVENTION

The increasing ability to access sensitive data remotely via networks increases risks of security breaches. In public open networks, such as the Internet, communication is susceptible to many types of security attacks, such as impersonation, session hijacking and virus attacks. In private internal networks, also known as intranets, organizations are susceptible to security breaches from inside the organizations as well as from the outside world.

Today, security solutions include tools such as firewalls which control access to a network by checking addresses of sources and targets in a communication session. However, firewalls do not deal with features such as user identity, access rights of a user, user and server authentication, data integrity, secure access to data and to specific applications, non-repudiation (i.e., inability to cancel a transaction after it is performed), session privacy and user accountability.

U.S. Pat. Nos. 5,282,249 and 5,481,609 to Cohen et al describe a system for controlling access to broadcast transmissions including a transmitter having a transmission encoder for scrambling the broadcast, a multiplicity of subscriber receivers, each having an identical receiving decoder, containing no cryptographic keys, for descrambling the broadcast and a plurality of selectable and portable executing apparatus each being, operatively associatable with a receiving decoder at a partially different given time and each executing generally identical operations to (venerate a seed for use by the associated receiving decoder to enable the receiving decoder to descramble the broadcast.

U.S. Pat. No. 5,666,412 to Handelman et al describes a CATV system including a CATV network and apparatus for transmitting over the CATV network information to a multiplicity of subscriber units, each including a CATV decoder and an IC card reader and writer coupled to the CATV decoder, the IC card reader and writer including two separate card receptacles, such that IC cards inserted into the two separate IC card receptacles are separately accessed by the IC card reader and writer.

U.S. Pat. No. 5,774,546 to Handelman et al describes one IC card with two separate integrated circuits embodied within, wherein each of the separate integrated circuits is separately accessible by an IC card reader and writer.

U.S. Pat. No. 4,405,829 to Rivest et al describes the RSA public-key encryption and digital signature challenge-response scheme.

U.S. Pat. No. 4,748,668 to Shamir et al describes the Fiat-Shamir identification and authentication scheme.

U.S. Pat. No. 4,709,136 to Watanabe describes an IC card reader/writer apparatus which includes at least two contactors in which IC cards are inserted, respectively, card detecting means for detecting that at least two IC cards have been loaded, and collating means verifying that correct cipher codes of the two IC cards coincide with those inputted externally; respectively, wherein access to the contents stored in the IC cards is allowed only when the collation results in coincidence.

U.S. Pat. No. 4,594,663 to Nagata et al describes a credit transaction processing system which processes data related to a commodity entered into by using a card owned by a customer and a recording card owned by a store.

U.S. Pat. No. 5,010,571 to Katznelson describes a system for controlling and accounting for retrieval of data from a CD-ROM memory containing encrypted data files from which retrieval must be authorized.

The following references describe some aspects of related technology:
U.S. Pat. No. 4,159,417 to Rubincam;
U.S. Pat. No. 4,160,242 to Fowler et al,
U.S. Pat. No. 4,290,062 to Marti et al;
U.S. Pat. No. 4,350,070 to Bahu;
U.S. Pat. No. 4,589,659 to Yokoi et al;
U.S. Pat. No. 4,639,225 to Washizuka;
U.S. Pat. No. 4,680,459 to Drexler;
U.S. Pat. No. 4,740,912 to Whitaker;
U.S. Pat. No. 4,855,725 to Fernandez;
U.S. Pat. No. 4,917,292 to Drexler;
U.S. Pat. No. 4,937,821 to Boulton;
U.S. Pat. No. 4,985,697 to Boulton;
U.S. Pat. No. 5,113,178 to Yasuda et al;
U.S. Pat. No. 5,167,508 to McTaggart;
U.S. Pat. No. 5,239,665 to Tsuchiya;
U.S. Pat. No. 5,285,496 to Frank et al;
U.S. Pat. No. 5,339,091 to Yamazaki et al;
U.S. Pat. No. 5,371,493 to Sharpe et al;
U.S. Pat. No. 5,413,486 to Burrows et al;
U.S. Pat. No. 5,438,344 to Oliva;
U.S. Pat. No. 5,466,158 to Smith III;
U.S. Pat. No. 5,469,506 to Berson et al;
U.S. Pat. No. 5,484,292 to McTaggart;
U.S. Pat. No. 5,533,124 to Smith et al;
U.S. Pat. No. 5,534,888 to Lebby et al;
U.S. Pat. No. 5,555,446 to Jasinski;
U.S. Pat. No. 5,625,404 to Grady et al;
U.S. Pat. No. 5,630,103 to Smith et al;
U.S. Pat. No. 5,661,635 to Huffman et al;
U.S. Pat. No. 5,663,748 to Huffman et al;
U.S. Pat. No. 5,689,648 to Diaz et al;
U.S. Pat. No. 5,697,793 to Huffman et al;
European Patent Application 0 683 613 A2, assigned to AT&T Corporation; and
an article titled "Virtual Meetings with Desktop Conferencing", by Amitava Dutta-Roy, in IEEE Spectrum, July 1998, pages 47-56.

Additionally, technologies related to the SSL (Secure Socket Layer) protocol, and the IPSEC (IP Security) protocol are described in a book titled "Internet and Intranet Security", by R. Oppliger, published by Artech House 1998, in section 10.3 on pages 226-239 and in section 9.3 on pages 160-177 respectively.

The disclosures of all references mentioned above and throughout the present specification are hereby incorporated herein by reference.

SUMMARY OF THE INVENTION

The present invention seeks to provide remote administration of smart cards in securely accessed information resources and communication networks.

In the present invention, a plurality of smart cards are associated or paired, via a communication network, with a remote administration system, generally referred to as a remote administrator. The smart cards are typically administrated by the remote administrator. Preferably, a smart card is administrated by the remote administrator immediately after communication with the remote administrator or an information resource associated with the remote administrator is established.

The remote administrator preferably uses techniques of challenge-response to authenticate, validate and verify the smart card. For this purpose, the remote administrator may use an access control module which performs at least one of authentication, validation and verification of the smart card either by executing a public-key based software program, or by comparing one of authentication, validation and verification information received from the smart card with corresponding information resident in a data base module, and enabling the smart card to access a protected information resource in response to a favorable comparison result.

The remote administrator may be also operative to transfer administration rights to a proxy administrator which is preferably in the proximity of a user unit in which the smart card is inserted.

Furthermore, the remote administrator may also enable transfer of authorization information between two smart cards which are preferably associated with the remote administrator. Preferably, a first smart card may authorize a second smart card to perform certain transactions and operations via the remote administrator.

Administration of smart cards may be employed in a secure access system which provides access to a protected information resource. In such a case, after a smart card is at least one of authenticated, validated and verified, an owner of the smart card may gain access to the protected information resource via an information resource controller.

There is thus provided in accordance with a preferred embodiment of the present invention a method for remote administration of at least one smart card via a communication network, the method including associating the at least one smart card with a remote administrator by storing administrator identification information of the remote administrator in the at least one smart card, inserting the at least one smart card in at least one user unit, employing the administrator identification information stored in the at least one smart card to identify the remote administrator associated with the at least one smart card, and establishing communication between the at least one smart card and the remote administrator via the communication network in accordance with the administrator identification information.

Preferably, the establishing step is performed via the at least one user unit. The establishing step may preferably include the step of employing Internet Protocol (IP) for communication via the communication network.

Preferably, the establishing step may include the steps of identifying a local administrator other than the remote administrator, the local administrator being positioned in the communication network in a proximity to the at least one user unit, and determining the local administrator as a proxy administrator for administrating the at least one smart card by transmitting at least authorization information from the remote administrator to the local administrator.

Additionally, the method also includes the step of administrating the at least one smart card after communication with the remote administrator is established, and preferably, immediately after communication with the remote administrator is established.

Furthermore, the method may also include the step of administrating the at least one smart card after communication with the proxy administrator is established, and preferably, immediately after communication with the proxy administrator is established.

The administrating step may preferably include performing an administration initialization procedure to at least one of authenticate, verify and validate the at least one smart card.

Additionally, the method also includes the step of preventing performance of any operation other than the administration initialization procedure until the administration initialization procedure is verified to be in order.

The step of employing the administrator identification information to identify the remote administrator preferably includes the step of identifying the at least one smart card in a smart card data base at the remote administrator.

Additionally, the method also includes the step of accessing a protected information resource by the at least one smart card via the remote administrator associated therewith. The accessing step preferably includes the step of performing at least one administration operation.

Preferably, the at least one administration operation includes at least one of the following: transmission of a certificate, transmission of credentials, transmission of a key, renewal of the at least one smart card, expiration date updating, renewal of an authorization to the at least one smart card, validity check of data in the at least one smart card, integrity check of data in the at least one smart card, memory load/check, revocation of at least one of an authorization, a certificate and a smart card, execution of a "KILL CARD" process after a verification of a need to prevent operation of the at least one smart card, data load, and transmission of smart card chaining information.

Preferably, the accessing step includes the step of performing security mechanisms for accessing the protected information resource by the at least one smart card. The security mechanisms preferably include at least one of the following: unilateral or bilateral authentication, time stamping, non-repudiation, digital signatures, distribution of an encryption key, change of an encryption key, encryption, and password authorization.

Preferably, each operation performed during the accessing step by at least one of the remote administrator and the at least one smart card is performed only upon receipt of an "END ADMINISTRATION OPERATION" instruction at a corresponding one of the at least one of the remote administrator and the at least one smart card.

The remote administrator may preferably include a plurality of administrators, each operative to perform at least part of the step of accessing the protected information resource and/or at least part of the administration initialization procedure.

There is also provided in accordance with a preferred embodiment of the present invention a secure access method for use with a communication network which communicates information between an information resource controller and a remote unit, the method including identifying, at the remote unit, a command to upload data, employing, in response to the command, a hash function at the remote unit to encode contents of at least a portion of a memory at the remote unit and thereby to produce a hashed result, transmitting the hashed result to the information resource controller, comparing, at the information resource controller, the hashed result with a trusted hashed result maintained at the information resource controller thereby to provide a comparison result, and determining integrity of the contents of the at least a portion of the memory at the remote unit based, at least in part, on the comparison result.

Preferably, the determining step includes the step of transmitting repairing information to the remote unit to correct the contents of the at least a portion of the memory at the remote unit if the comparison result is unfavorable.

The command is preferably generated at the remote unit periodically. Preferably, the command is transmitted from the information resource controller to the remote unit periodically. Alternatively, the command is generated at the remote unit following a communication failure event. Yet alternatively, the command is transmitted from the information resource controller to the remote unit following a communication failure event.

In accordance with a preferred embodiment of the present invention there is provided a method for remote administration of a first smart card and a second smart card via a communication network, the method including associating the first smart card and the second smart card with a remote administrator, and transmitting authorization information from the first smart card to the second smart card via the remote administrator and the communication network.

Preferably, the authorization information includes at least one of the following: administrator identification information, authorization to perform a transaction, an electronic-mail message stored in the first smart card, and billing history information.

In any of the above mentioned methods, the communication network preferably includes at least one of the following: a local-area-network (LAN), a metropolitan-area-network (MAN), and a wide-area-network (WAN). The communication network may include at least one of the following networks: the Internet, CompuServe, and America-On-Line.

There is also provided in accordance with a preferred embodiment of the present invention a remote administrator for administrating at least one smart card via a communication network, the remote administrator including a processor, the processor including an access control module operative to control access to a protected information resource, and a data base module operative to map the at least one smart card to an access control list.

Additionally, the remote administrator also includes a memory operative to store a log of the communication network activity. The remote administrator may also include communication apparatus for transmitting authorization information from a first smart card associated with the remote administrator to a second smart card associated with the remote administrator via the communication network.

In accordance with a preferred embodiment of the present invention there is also provided a system for remote administration of at least one smart card via a communication network, the system including a remote administrator having administrator identification information, at least one user unit, and at least one smart card associated with the remote administrator by storing in the at least one smart card the administrator identification information of the remote administrator, wherein the at least one smart card inserted in the at least one user unit is operative to employ the administrator identification information to identify the remote administrator associated with the at least one smart card, and to establish communication via the communication network between the at least one smart card and the remote administrator in accordance with the administrator identification information.

There is also provided in accordance with a preferred embodiment of the present invention a system for providing secure access in a communication network including a remote unit operative to identify a command to upload data, and to employ, in response to the command, a hash function to encode contents of at least a portion of a memory associated with the remote unit thereby to produce a hashed result, and an information resource controller operatively associated with the remote unit and operative to receive, from the remote unit, the hashed result, to compare the hashed result with a trusted hashed result maintained at the information resource controller thereby to provide a comparison result, and to determine integrity of the contents of the at least a portion of the memory based, at least in part, on the comparison result.

BRIEF DESCRIPTION OF THE DRAWINGS

The present invention will be understood and appreciated more fully from the following detailed description, taken in conjunction with the drawings in which:

FIG. 2 is a simplified block diagram illustration of a preferred implementation of a remote administrator in the system of FIG. 1;

FIG. 5 is a simplified flow chart illustration of still another preferred method of operation of the apparatus of FIGS. 1 and 2.

DETAILED DESCRIPTION OF A PREFERRED EMBODIMENT

Figure 1:
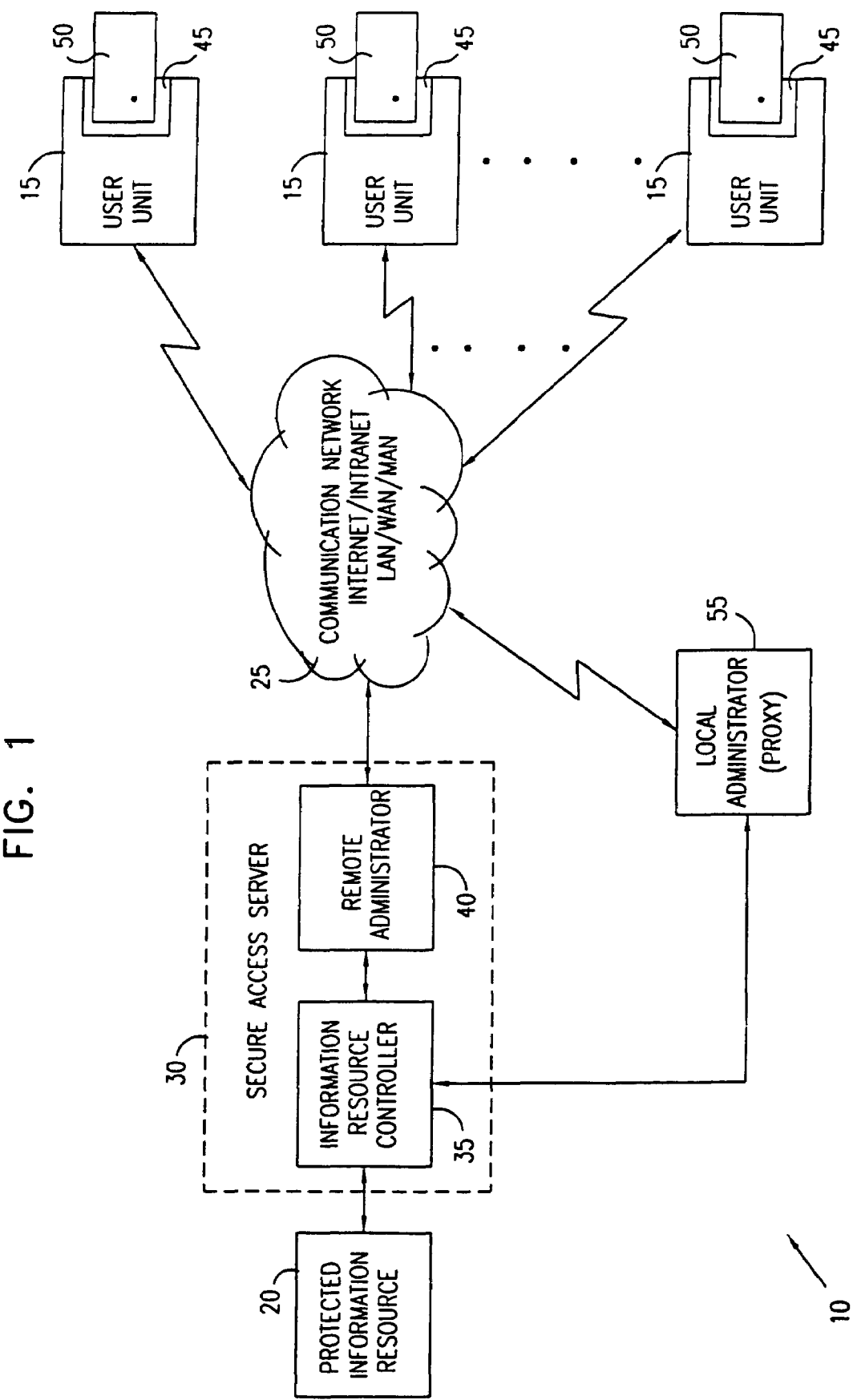
FIG. 1 is a simplified block diagram illustration of a preferred implementation of a system for providing secure access to information resources associated with communication networks, the system being constructed and operative in accordance with a preferred embodiment of the present invention.

Reference is now made to FIG. 1 which is a simplified block diagram illustration of a preferred implementation of a system 10 which is operative to provide secure access to information resources associated with communication networks, the system 10 being constructed and operative in accordance with a preferred embodiment of the present invention.

Preferably, the system 10 includes a plurality of user units 15 which may communicate with a protected information resource 20 via a communication network 25 and a secure access (SA) server 30. Alternatively, the user units 15 may communicate only with the SA server 30 via the communication network 25. Further alternatively, the protected information resource 20 may be embodied in the SA server 30.

The communication network 25 may preferably include at least one of the following configurations: a local-area-network (LAN); a metropolitan-area-network (MAN); and a wide-area-network (WAN). Networks operating in such configurations may include, for example, intranets as well as the Internet, CompuServe, and America-On-Line.

The protected information resource 20 may preferably include at least one source of information to be protected, such as an intranet or a corporate LAN, a database, a hard disk and a server. The protected information resource 20 is preferably accessed via an information resource controller 35 which is preferably embodied in the SA server 30. It is appreciated that the information resource controller 35 provides an interface which interfaces and operates the protected information resource 20.

Preferably, the information resource controller 35 is controlled by a remote administration system 40, generally referred to as the remote administrator 40, which may be also embodied in the SA server 30. The remote administrator 40 preferably administrates the plurality of user units 15 and controls access by the user units 15 to the protected information resource 20. It is appreciated that the remote administrator 40 may be associated with conventional security means, such as firewalls, to prevent unauthorized entries to the system 10.

Preferably, each user unit 15 may include a smart card reader 45 which is associated with a removable smart card 50. Alternatively, the smart card reader 45 may be replaced by a card interface (not shown), and the smart card 50 may be replaced by any conventional security chip associated with a removable unit (not shown) which may be accessed by the card interface.

Preferably, the smart card reader 45 is operative to read data from and write data to the smart card 50. It is appreciated that the remote administrator 40 may also administrate the smart cards 50 via the smart card readers 45.

Preferably, the system 10 may also include a local administrator 55 which may be determined by the remote administrator 40 as a proxy administrator for administrating at least one of the smart cards 50. The local administrator 55 may be operatively associated with the information resource controller 35 either directly or via the communication network 25. It is appreciated that the local administrator 55 may be positioned in the communication network 25 in a proximity to at least one of the user units 15 associated with the at least one of the smart cards 50.

It is appreciated that although the system 10 is especially suitable for an open communication network, such as the Internet or an intranet coupled to the Internet, it may be also used in a closed communication network which does not communicate with other networks to provide access to data to users having different security clearances.

Reference is now made to FIG. 2 which is a simplified block diagram illustration of a preferred implementation of the remote administrator 40 in the system 10 of FIG. 1, the remote administrator 40 being constructed and operative in accordance with a preferred embodiment of the present invention.

Preferably, the remote administrator 40 includes a processor 100, and communication apparatus 105 and a memory 110 which are each operatively associated with the processor 100. The processor 100 preferably includes an access control module 115 and a data base module 120 which are operatively associated with the communication apparatus 105 and the memory 110 via a communication bus 125. Alternatively, the data base module 120 may be embodied in a remote server (not shown) which may serve a plurality of remote administrators 40 and may be accessed by the processor 100. It is appreciated that the data base module 120 may include a local data base which may communicate with a central data base resident in the remote server.

Further alternatively, the data base module 120 may be optional if security algorithms performed by the remote administrator 40 include public-key based software programs.

It is appreciated that the processor 100, the memory 110, and the communication apparatus 105 may be embodied in a single conventional integrated circuit (IC). Alternatively, the communication apparatus 105 may be embodied in a conventional modem (not shown). It is to be appreciated that the remote administrator 40 may be embodied in a conventional server unit (not shown), and may be implemented in software or in hardware, or in a combination thereof.

The operation of the apparatus of FIGS. 1 and 2 is now briefly described. Preferably, a user operates a user unit 15 and inserts a smart card 50 in a receptacle (not shown) in a smart card reader 45 embodied in the user unit 15. Alternatively, the user may use a contactless smart card, such as an RF (Radio-Frequency) smart card, which communicates with the smart card reader 45 over the air without establishing contact with the smart card reader 45.

Preferably, the user unit 15 establishes communication with the communication network 25. It is appreciated that smart cards that fit slots in smart card readers, contactless smart cards, and smart card readers embodied in user units and suitable for use with smart cards or contactless smart cards are well known in the art.

When the smart card 50 is operated for the first time, the smart card 50 is preferably associated or paired with a remote administrator, for example the remote administrator 40. In such a case, administrator identification information of the remote administrator 40 is stored in the smart card 50 for future use.

If the smart card 50 has already been in use, the smart card 50 employs the administrator identification information already stored in it to search and identify the remote administrator 40 as the remote administrator which is associated with it. It is appreciated that the administration identification information may be stored in the smart card 50 in advance at a smart card issuer facility or at a smart card production plant before the smart card 50 is provided to the user.

Preferably, the smart card 50 is determined to be associated with the remote administrator 40 if the smart card 50 is identified to be in a smart card data base at the remote administrator 40.

Preferably, once the remote administrator 40 is identified as the remote administrator associated or paired with the smart card 50, communication between the smart card 50 and the remote administrator 40 may be established via the communication network 25 in accordance with the administrator identification information, and the smart card 50 may be immediately administrated by the remote administrator 40. Additionally or alternatively, the smart card 50 may be administrated at an end of a communication session, and before or after performance of a specific operation.

It is appreciated that the communication between the smart card 50 and the remote administrator 40 may be initiated by one of the smart card reader 45, a software program resident in the user unit 15, and the remote administrator 40.

The communication between the smart card 50 and the remote administrator 40 may preferably employ the well known Internet Protocol (IP). Additionally, any other suitable conventional communication protocol may be used, such as the SSL (Secure Socket Layer), and the IPSEC (Internet Protocol Security) which are security protocols running above different levels of the IP.

Administration of the smart card 50 by the remote administrator 40 preferably begins by performing an administration initialization procedure to at least one of authenticate, verify and validate the smart card 50. Preferably, authentication, verification and validation of the smart card 50 may be performed by using well known techniques of challenge-response of either information related to shared secrets or public/private keys, such as the RSA challenge-response scheme, the Fiat-Shamir identification and authentication scheme, and keyed-hash schemes.

The techniques of challenge-response typically employ communication of the information related to the shared secrets or public/private keys between the smart card 50 and the access control module 115 via the communication apparatus 105 and the communication network 25. The access control module 115 preferably performs at least one of authentication, validation and verification of the smart card 50 by comparing information related to one of authentication, validation and verification information received from the smart card 50 with corresponding information provided by the data base module 120 and enabling the smart card 50 to access the protected information resource 20 in response to a favorable comparison result. It is appreciated that the data base module 120 preferably maps the smart card 50 to an access control list.

Alternatively, the access control module 115 may perform at least one of authentication, validation and verification of the smart card 50 by executing a public-key based software program.

If the information related to authentication, verification and validation which is received from the smart card 50 matches information in the access control list in the data base module 120, the smart card 50 may be administrated by the remote administrator 40 and/or may be allowed to access the protected information resource 20 via the information resource controller 35 as the case may be.

It is appreciated that until the administration initialization procedure is verified to be in order, performance of any operation other than the administration initialization procedure is preferably prevented. Preferably, a log of all communication activity related to the authentication, verification and validation of the smart card 50 is stored in the memory 110.

Once the smart card 50 is allowed to access the protected information resource 20, the smart card 50 may access the protected information resource 20 to read data from and/or write data to the protected information resource 20. Alternatively or additionally, the smart card 50 may also access the protected information resource 20 to perform a transaction in which data in the protected information resource 20 may be altered as well as viewed. The term "transaction" is used throughout the specification and claims to include any operation which alters data in the protected information resource 20 or in the smart card 50. An example of an operation which alters data in the protected information resource 20 or the smart card 50 includes a value related exchange of information or goods, such as extraction of data in exchange of billing tokens or money. Another example of an operation which alters data in the protected memory resource 20 or the smart card 50 includes billing per operation, such as billing per meal taken by an employee in an organization.

It is appreciated that each read operation, write operation and transaction operation performed on data in the protected information resource 20 or the smart card 50 may preferably be associated with at least one administration operation. Preferably, the at least one administration operation includes at least one of the following: transmission, from a certificate issuing authority, a public-key certificate which authorizes a smart card holder; transmission of credentials which provide authorization to perform specific operations; transmission of an encryption key; renewal of the smart card 50 or updating of the expiration date of the smart card 50; renewal of an authorization to the smart card 50 to perform an operation; validity check of data in the smart card 50; integrity check of data in the smart card 50; memory load/check; revocation of an authorization, a certificate or the smart card 50; execution of a "KILL CARD" process after a verification of a need to prevent operation of the smart card 50; data load; and transmission of smart card chaining information which links the smart card 50 to another smart card (not shown), or information of general interest which may be used by the other smart card, such as a list of selected URLs (Uniform Resource Locators).

Preferably, all security mechanisms for accessing the protected information resource 20 for reading, writing and performing a transaction are performed in the smart card 50. The security mechanisms may preferably include at least one of the following: unilateral or bilateral authentication, time stamping; non-repudiation (i.e. inability to cancel a transaction after it is performed); digital signatures; distribution of an encryption key; change of an encryption key; encryption; and password authorization.

It is appreciated that each operation is performed, either by the smart card 50 or the remote administrator 40, only upon receipt of an "END ADMINISTRATION OPERATION" instruction at a corresponding one of the smart card 50 and the remote administrator 40. Operations requiring the "END ADMINISTRATION OPERATION" instruction typically include any operation performed on the data in the protected information resource 20 or in the smart card 50, any administration operation and any operation performed as part of the security mechanism.

It is appreciated that the remote administrator 40 may include a plurality of administrators, each operative to perform at least part of an accessing task to access the protected information resource and/or at least part of the administration initialization procedure.

In a preferred embodiment of the present invention the remote administrator 40 may transfer rights and authorization to administrate smart cards to the local administrator 55. It is appreciated that such an option may be suitable in a case that the user travels to a distant location and administration by the remote administrator 40 is inconvenient. In such a case, if the local administrator 55 is identified to be in the proximity of the user, the local administrator 55 may be determined as a proxy administrator for administrating the smart card 50. It is appreciated that determination of the local administrator 55 as the proxy administrator for administrating the smart card 50 may be performed by transmitting at least authorization information from the remote administrator 40 to the local administrator 55 via the communication apparatus 105 and the communication network 25. Preferably, the smart card 50 is administrated by the local administrator 55 functioning as a proxy administrator immediately after communication with the local administrator 55 is established.

Preferably, the remote administrator 40 may be also used to transfer authorizations and rights between smart cards. In such a case, a first smart card and a second smart card may be each associated with the remote administrator 40 via the communication network 25. Then, authorization information may be transmitted from the first smart card to the second smart card via the communication apparatus 105 and the communication network 25. The authorization information preferably includes at least one of the following: administrator identification information; authorization to perform a transaction; an electronic-mail message stored in the first smart card; data; billing history information; a token, and a stored configuration.

Figure 3A:
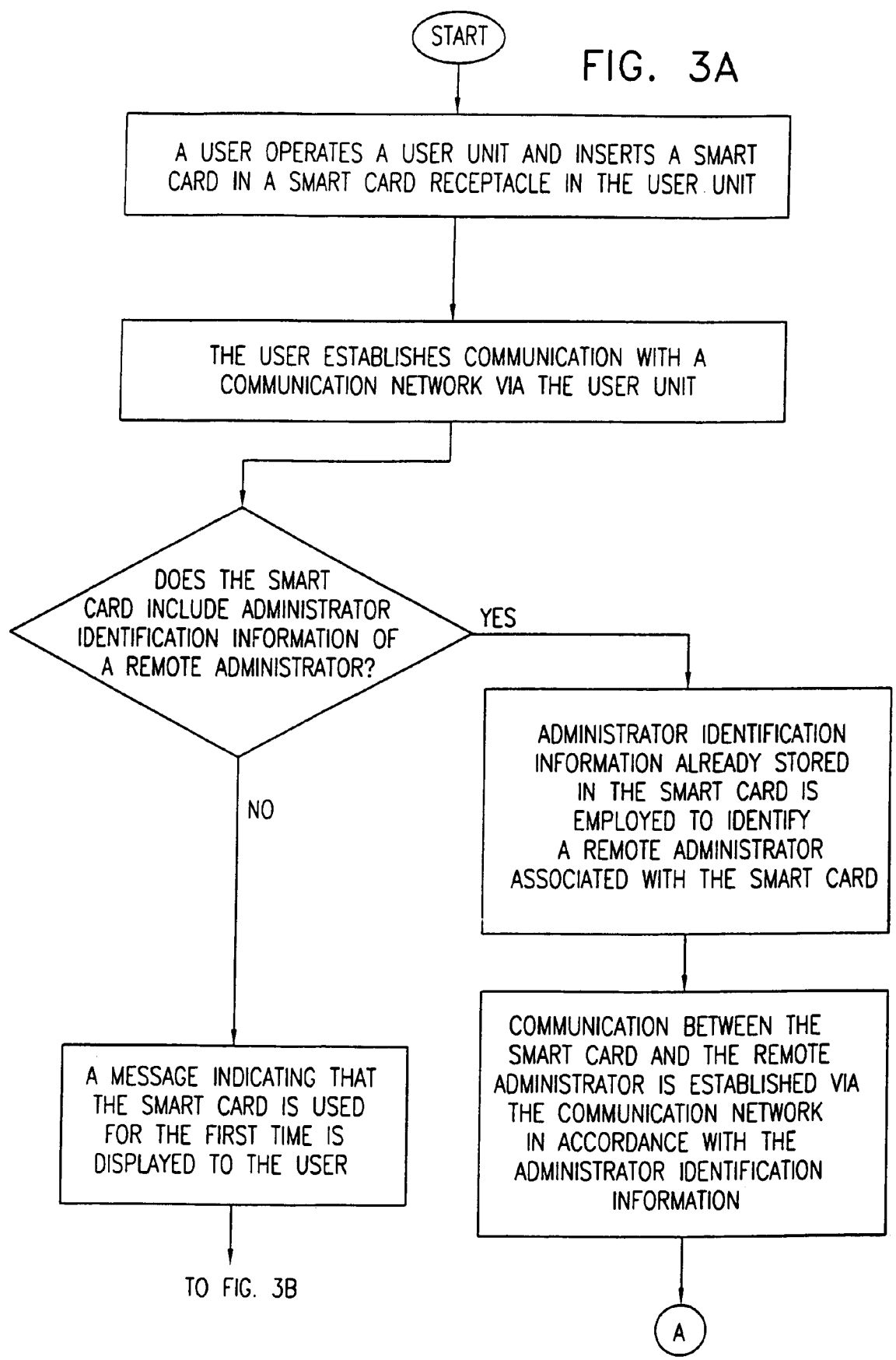
FIGS. 3A and 3B together constitute a simplified flow chart illustration of a preferred method of operation of the apparatus of FIGS. 1 and 2.
Figure 3B:
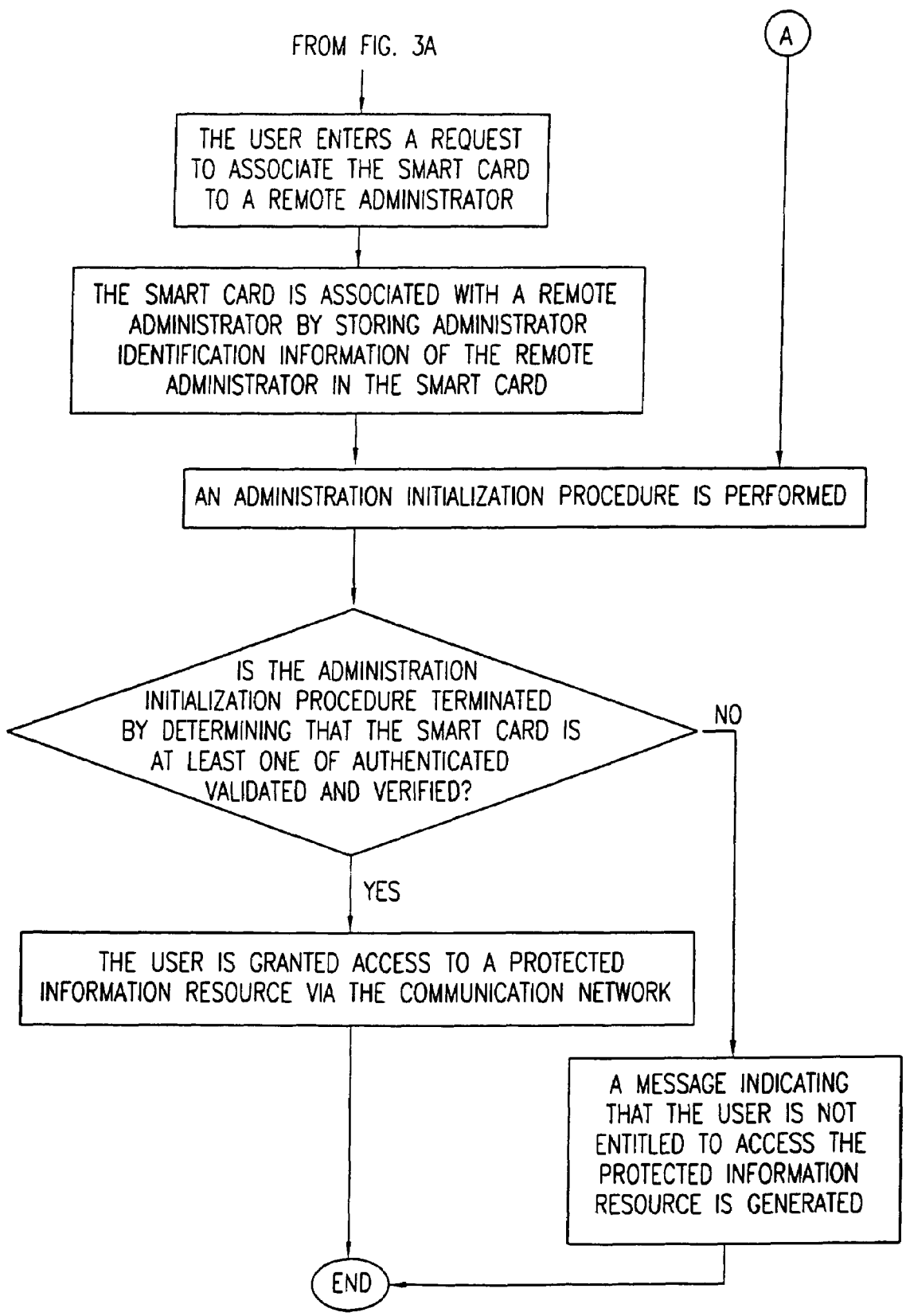

Reference is now made to FIGS. 3A and 3B which together constitute a simplified flow chart illustration of a preferred method of operation of the apparatus of FIGS. 1 and 2.

Preferably, a user operates a user unit and inserts a smart card in a smart card receptacle in the user unit. Then, the user establishes communication with a communication network via the user unit.

If administrator identification information is not stored in the smart card, then the smart card is considered to be used for the first time, and a message indicating that the smart card is used for the first time is displayed to the user. In response to the message, the user preferably enters a request to associate the smart card to a remote administrator and the smart card is associated with a remote administrator by storing administrator identification information of the remote administrator in the smart card.

If the smart card has already been in use and administrator identification information is stored in the smart card, the administrator identification information which is already stored in the smart card is employed to identify a remote administrator associated or paired with the smart card. It is appreciated that identification of the remote administrator with which the smart card is associated may also require input of user identification information, such as a PIN (Personal Identification Number), by the user.

Preferably, once the remote administrator associated with the smart card is identified, communication between the smart card and the remote administrator is established via the communication network in accordance with the administrator identification information, and an administration initialization procedure is preferably performed. It is appreciated that the administration initialization procedure is preferably transparent to the user except for a demand to enter a PIN which may be applicable in certain cases.

If the administration initialization procedure is terminated by determining that the smart card is at least one of authenticated, validated and verified, the user is granted access to a protected information resource via the communication network. If the smart card is not one of authenticated, validated or verified, a message indicating that the user is not entitled to access the protected information resource is generated and optionally displayed to the user.

Figure 4:
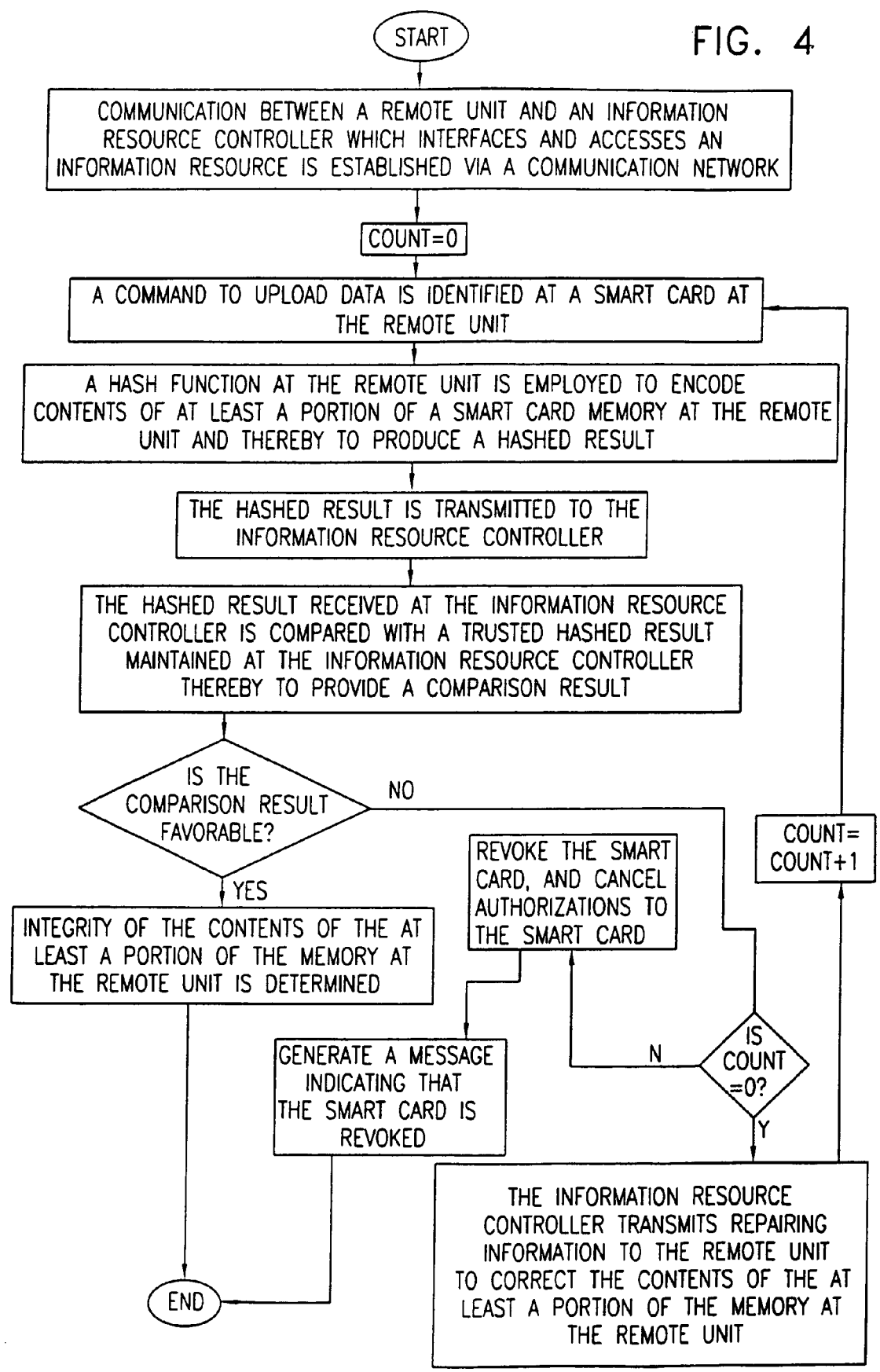
FIG. 4 is a simplified flow chart illustration of another preferred method of operation of the apparatus of FIGS. 1 and 2.

Reference is now made to FIG. 4 which is a simplified flow chart illustration of another preferred method of operation of the apparatus of FIGS. 1 and 2.

Preferably, communication between a remote unit and an information resource controller which interfaces and accesses an information resource is established via a communication network. At the remote unit, a command to upload data is preferably identified. In response to the command, a hash function at the remote unit is employed to encode contents of at least a portion of a memory at the remote unit and thereby to produce a hashed result. It is appreciated that the memory at the remote unit may include a memory in a smart card.

Preferably, the hashed result is transmitted to the information resource controller. At the information resource controller, the hashed result is preferably compared with a trusted hashed result maintained at the information resource controller thereby to provide a comparison result. Preferably, if the comparison result is favorable, integrity of the contents of the at least a portion of the memory at the remote unit is determined.

If the comparison result is unfavorable, the information resource controller may preferably transmit repairing information to the remote unit to correct the contents of the at least a portion of the memory at the remote unit, and then the contents of the at least a portion of the memory at the remote unit may be checked by again generating a command to upload data as mentioned above and proceeding accordingly.

It is appreciated that if after using the repairing information the hashed result still does not match the trusted hashed result, the smart card may be revoked, all authorizations to the smart card may be canceled, and a message indicating the smart card is revoked may be generated.

Alternatively, if the comparison result is unfavorable, the information resource controller may directly revoke the smart card and cancel authorizations to the smart card without transmitting repairing information.

The command to upload data may preferably be generated at the remote unit periodically or following a communication failure event. Alternatively, the command may be transmitted from the information resource controller to the remote unit periodically or following a communication failure event.

Reference is now made to FIG. 5 which is a simplified flow chart illustration of still another preferred method of operation of the apparatus of FIGS. 1 and 2.

Preferably, a first user operates a first user unit and inserts a first smart card in a smart card receptacle in the first user unit. Similarly, a second user operates a second user unit and inserts a second smart card in a smart card receptacle in the second user unit. Preferably, the first user and the second user establish communication with a remote administrator via a communication network and the corresponding first and second user units. Then, the first smart card and the second smart card may be associated with the remote administrator.

Once the first smart card and the second smart card are associated with the remote administrator the first user may enter a command, via the first user unit or a keypad attached to the first smart card, to transmit authorization information from the first smart card to the second smart card via the remote administrator and the communication network. Preferably, the authorization information enables the second user to perform transactions authorized by the first user with a protected information resource via the remote administrator by using the second smart card.

It is appreciated that the second smart card may be used separately from the first smart card and at different times. In such a case, the authorization information addressed to the second smart card may be stored in the remote administrator until communication is established between the second smart card and the remote administrator, and then the remote administrator may transmit to the second smart card the authorization information addressed to the second smart card.

It will be appreciated by persons skilled in the art that the present invention is not limited by what has been particularly shown and described herein above. Rather the scope of the present invention includes both combinations and subcombinations of the features described hereinabove as well as modifications and variations thereof which would occur to a person of skill in the art upon reading the foregoing description and which are not in the prior art, and is defined only by the claims which follow.

What is claimed is:

1. A method for remote administration of a first smart card of a first user and a second smart card of a second user via a communication network, the first smart card and the second smart card being employed in a secured access system, the method comprising:

associating said first smart card and said second smart card with a remote administrator the first smart card comprising authorization information which entitles the first user to access a secured information resource, and the second smart card not comprising authorization information which entitles the second user to access the secured information resource;

commanding, by the first user, transmission of the authorization information from the first smart card to the second smart card; and transmitting the authorization information from said first smart card to said second smart card via the remote administrator and the communication network, thereby enabling the second smart card to allow the user of the second smart card to access the secured information resource.

2. A method according to claim 1 and wherein said authorization information comprises at least one of the following: administrator identification information; authorization to perform a transaction; an electronic-mail message stored in said first smart card; and billing history information.

3. A method according to claim 1 and wherein said communication network comprises at least one of the following: a local-area-network (LAN); a metropolitan-area-network (MAN); and a wide-area-network (WAN).

4. A method according to claim 1 and wherein said communication network comprises at least one of the following networks: the Internet; CompuServe; and America-Online.

5. A method according to claim 1 and wherein a first user unit or keypad is attached to the first smart card.

6. A method according to claim 1 and wherein the first user and the second user are the same user.

7. A remote administration system for remotely administering a first smart card and a second smart card via a communication network, the first smart card and the second smart card being employed in a secured access system, the system comprising:

a remote administrator operatively associated with said first smart card and said second smart card, the first smart card comprise authorization information which entitles the first user to access a secured information resource, and the second smart card not comprising authorization information which entitles the second user to access the secured information resource; and a transmitter transmitting the authorization information from said first smart card to said second smart card via said remote administrator and the communication network, thereby enabling the second smart card to allow the user of the second smart card to access the secured information resource.

8. A remote administration system for remotely administering a first smart card and a second smart card via a communication network, the first smart card and the second smart card being employed in a secured access system, the system comprising:

means for operatively associating first smart card and said second smart card with remote administration means, the first smart card comprising authorization information which entitles the first user to access a secured information resource, and the second smart card not comprising authorization information which entities the second user to access the secured information resource; and means for transmitting the authorization information from said first smart card to said second smart card via said remote administration means and the communication network, thereby enabling the second smart card to allow the user of the second smart card to access the secured information resource.

* * * * *